United States Patent
Torkkeli

[11] Patent Number: 5,972,058
[45] Date of Patent: Oct. 26, 1999

[54] METHOD OF TREATING WASTE SLUDGE

[76] Inventor: Esko Ilmari Torkkeli, Haapakuja 11C 19, Oulu, Finland, 90650

[21] Appl. No.: 08/973,837
[22] PCT Filed: Jun. 26, 1996
[86] PCT No.: PCT/FI96/00374
§ 371 Date: Dec. 17, 1997
§ 102(e) Date: Dec. 17, 1997
[87] PCT Pub. No.: WO97/01513
PCT Pub. Date: Jan. 16, 1997

[30] Foreign Application Priority Data

Jun. 26, 1995 [FR] France ........................................ 953157

[51] Int. Cl.[6] .................. C10L 5/42; C10L 5/44; C10L 5/46
[52] U.S. Cl. .................. 44/552; 44/490; 44/492; 44/491; 44/605; 71/14
[58] Field of Search .............................. 44/490, 492, 580, 44/630, 552, 605, 491

[56] References Cited

U.S. PATENT DOCUMENTS

| | | |
|---|---|---|
| 4,082,532 | 4/1978 | Imhof . |
| 5,271,355 | 12/1993 | Bilings .................................... 119/171 |
| 5,389,114 | 2/1995 | Forder . |

FOREIGN PATENT DOCUMENTS

| | | |
|---|---|---|
| 1 592 588 | 1/1971 | Germany . |
| 36 24 234 | 1/1988 | Germany . |
| 41 10 950 | 10/1992 | Germany . |
| 683519 | 3/1994 | Switzerland . |
| WO 94/01369 | 1/1994 | WIPO . |

*Primary Examiner*—Cephia D. Toomer
*Attorney, Agent, or Firm*—Pollock, Vande Sande & Amernick

[57] ABSTRACT

The invention relates to a waste sludge treatment process in which a solid additive is mixed into sludge to produce solid products. The solid additive includes aggregate-like hydrophobic grains of peat.

8 Claims, 2 Drawing Sheets

METHOD OF TREATING WASTE SLUDGE

This application is a 371 of PCT/FI96/00374, filed Jun. 26, 1996.

FIELD OF THE INVENTION

The present invention relates to a waste sludge treatment process and particularly a treatment process in which an organic binding agent is added to waste sludge to produce products in solid form, such as biofuel.

BACKGROUND OF THE INVENTION

Waste sludge may originate from a mechanical, biological or chemical process. Treated waste sludge often is a mixture of different types of waste sludges from these processes. Current efforts of sludge treatment are aimed at treating community or industrial wastewater sludge, industrial flour sludge and agricultural animal excrement sludge in such a way as to cause as few environmental problems as possible, and also, on the other hand, to utilize the sludge as efficiently as possible.

Currently, waste sludge is often treated by means of composting, which is a time-consuming process requiring periodic mechanical handling of the compost material to improve aeration. Lately it has become common practice to burn sludge, especially in the wood processing industry, which is not an efficient method due to the high moisture content of the sludge, but which makes it possible to get rid of undesirable waste.

For a long time it has been understood that it would be advantageous to treat waste sludge by means of rapid processes in which the sludge is utilized in producing solid products, such as biofuel. The basic method used in such processes consists of mixing organic binding agents with the waste sludge, forming grains, pellets or similar particles from the mixture by means of pressing or by using pressing as an intermediate phase of the process, and then drying them. However, there are several problems involved in such processing of waste sludge. First of all, it is difficult to efficiently extract water from the sludge. It is difficult because the water is bound to the cell structure of the sludge. Waste sludge is usually dried after compaction by means of centrifuging or a pressing method such as filter pressing. Even after drying by means of such a reasonably quick method that consumes a reasonable amount of energy, the water content of the waste sludge is typically in the magnitude of 70–80%. A second problem involves formation of a coherent mass that may be shaped without having to use such an abundance of coagulants or moisture-binding organic additives that it is not economically feasable to use the process extensively. A third problem involves drying the products formed from the material to make them stabile and coherent. This means that, for example, bacterial action must be stopped so it will not degrade the product.

Attempts have been made to treat waste sludge, for example, by adding milled peat to it and then pressing it. However, a pressing method has not been found that efficiently and economically extracts water from such a mixture and allows easily shaped and dried, coherent products to be made from the mixture. A number of proposals have been made regarding methods by which solid products suitable for use as fertilizers or topsoil additives may be produced from agricultural waste sludge, in particular, and suitable organic additives. However, such proposals, one of which is examined in more detail below, do not present an efficient solution to the above-mentioned problems. U.S. Pat. No. 5,389,114 presents a process for producing biofuel that includes several mechanical and chemical treatment phases and disinfection phases, of which the last is microwave radiation. The disadvantage of this method is its complexity and on the other hand, the fact that it is largely based on the use of chemicals.

Swiss Patent No. 683519 presents a solution in which an organic additive, such as straw or sawdust, is mixed into agricultural sludge and the mixture is strongly extruded to produce a homogenous mass and then heated and dried to produce a nearly dry product. The extrusion may be repeated, after which drying may also be repeated.

German Patent Application No. 4110950 presents a solution in which a topsoil additive is produced from underwater sludge by mixing it with particle-, fiber- or flake-like organic material with a large outer surface and low moisture content, thus eliminating the sludge structure, after which the resulting mixture may be further mixed and then granulated and dried. In light of the presented examples, it appears that the method is suitable for treating sludge with a composition that meets certain requirements and has a quite low water content.

In the method of both documents cited above, the process is based on simply mixing a sufficiently suitable organic additive with the sludge to produce a mass suitable for further treatment. In order for this to be economical on a large scale, the characteristics of the waste sludge must be especially suitable for the treatment. If a large quantity of additive is required, for example, noticeably more than the quantity of waste sludge itself, the economy of the method of treatment becomes poor, as it was already stated above.

SUMMARY OF THE INVENTION

The object of the present invention is to provide an efficient and simple method of treating waste sludge in which water bound to the sludge may be efficiently extracted and in which a reasonable amount of additive is sufficient to form a mass which may be economically treated further to produce a solid product, such as biofuel.

To reach the above object, a waste sludge treatment process according to the present invention, in which a solid additive is mixed with sludge introduced into the process and the resulting mixture is further treated to produce solid products, is characterized in that the solid additive includes aggregate-like hydrophobic grains of peat. The hydrophobic grains of peat may make up at least one half of the solid additive. The solid additive may also include peat, wood chips, sawdust, bark, straw or dried plant parts.

In one advantageous embodiment the mixture is further treated by means of extrusion using a method that makes it possible to remove water extracted from the extruded material. Extrusion may be done with a V-wire hollow cone nozzle or similar device that includes wedge-like cracks in the wall of the nozzle that open outward.

In one advantageous embodiment the produced solid particles are hardened and made hygienic by essentially preventing bacterial action within them. For this purpose, the particles may be coated with a coating formed by a mixture of lime and water or ash and water.

The present invention is based on the realization that first the cell structure of the sludge must be vigorously broken down in order to economically extract a large portion of the water that is essentially bound to the cells in the sludge. The breaking down of the cell structure and the extraction of water also serves another purpose: it reduces the amount of bacterial action in the sludge or the mixture containing sludge. The bacteria are mainly water-dwelling organisms, so a reduction in moisture lowers bacterial action. In the process according to the present invention, it is advantageous to combine the process of breaking down the cells with the process of form-pressing the mass which may be achieved by means of the same extrusion by which the water is extracted. Experience has shown that when the additive that crushes the cell structure of the sludge during extrusion includes hard, aggregate-like hydrophobic grains of peat, the extraction of water is enhanced and bacterial action is reduced even further, as such grains of peat do not absorb water as do other organic additives.

The coating of the particles made from the press-formed mass with a mixture of lime and water or ash and water and the subsequent hardening of the coating stabilizes bacterial action, as it makes the surface very basic and prevents bacteria from penetrating into the particles from the outside. As the particles dry they also shrink considerably and the coating prevents oxygen from passing through their surface, also causing bacterial action within the particles to cease.

In one embodiment of the present invention, the crushing of the cell structure of the sludge and the aerobic state of the additive, such as aggregate-like hydrophobic grains of peat, create favorable conditions that activate aerobic bacterial action in the mass being formed, which is an advantageous way to begin drying the press-formed mass. When the particles made from the press-formed mass are placed in conditions in which aerobic bacterial action continues, the resulting heat dries the particles quickly, whereupon bacterial action ceases and the particles stabilize themselves.

BRIEF DESCRIPTION OF THE DRAWINGS

The present invention is explained in more detail in the following, with references to the enclosed drawings.

DETAILED DESCRIPTION OF THE INVENTION

Figure 1:
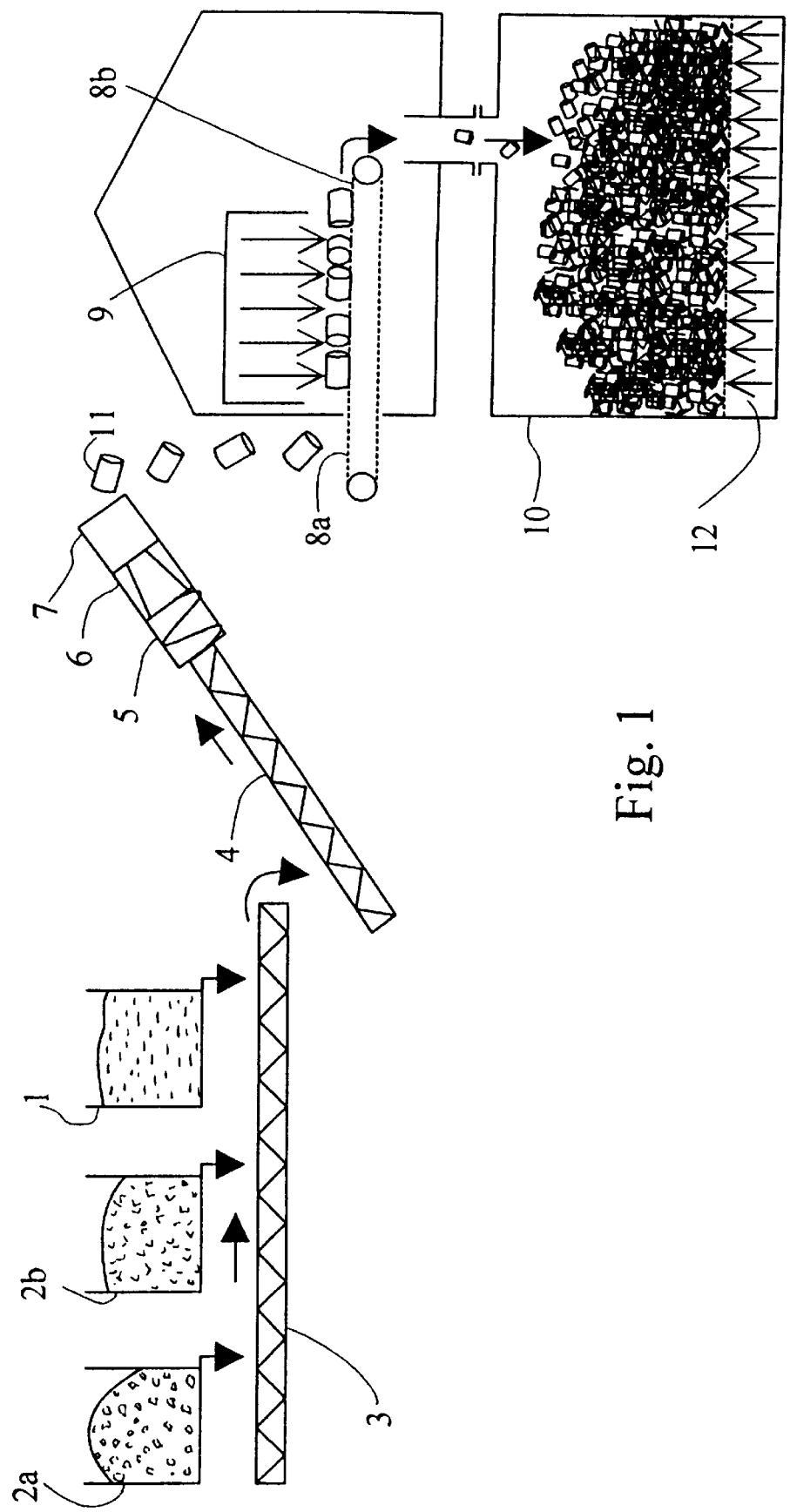
FIG. 1 diagrammatically represents an embodiment of a process according to the present invention and FIGS. 2 and 3 illustrate a possible embodiment of an advantageous extrusion method of a process according to the present invention.

In the example embodiment of FIG. 1, waste sludge is contained in a sludge tank 1. Depending on the realization of the process, the sludge is generally already pre-treated and dried at this stage. The water content of the sludge may be 70–80%, for example. Organic additives are contained in tanks 2a and 2b. Tank 2a contains aggregate-like hydrophobic grains of peat and tank 2b contains bark, sawdust or similar material, for example. The waste sludge and organic additives are mixed by suitably portioning them out on a transporting and mixing conveyor or screw 3. It is most advantageous to mix them by first portioning out the lighter hydrophobic grains of peat from tank 2a and then the heavier additive, in this case bark, sawdust, or similar material, from tank 2b, and last of all the waste sludge, the heaviest ingredient, from tank 1. The mixture passes from the transporting and mixing conveyor or screw 3 to another mixer, such as a mixer screw 4, which thoroughly mechanically mixes the mixture and produces a homogenous mass.

In an advantageous embodiment of the process according to the present invention, the mass is extruded by means of a method that allows the water to be removed from the pressed mass. For this purpose, the mass passes from the mixer screw 4 to a screw press 5, which presses it through an extruder 6. The extruder is advantageously a V-wire hollow cone nozzle, which has been successfully used in drying paper pulp and which is described in more detail below with references to FIGS. 2 and 3. As the mass is pressed through the extruder 6, water contained mainly in the waste sludge is extracted because the particles of organic additive, especially hydrophobic grains of peat, crush the cell structure of the waste sludge, which contains moisture. During extrusion the mass is also mixed further as colloidal particles move within the mass and transport moisture to the surface of the mass.

Figure 2:
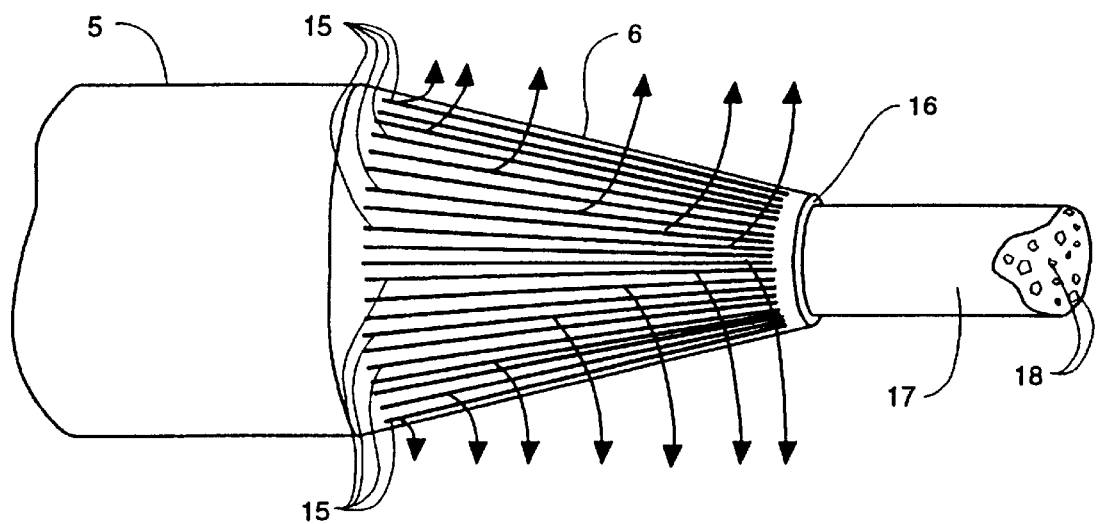
Figure 3:
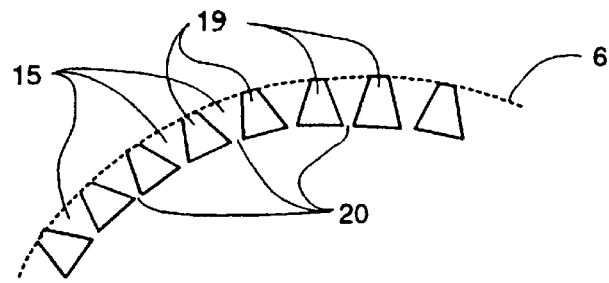

FIGS. 2 and 3 present a diagrammatic view of an extruder that efficiently extracts water during extrusion. The walls of the nozzle 6, which is connected to a screw press 5, have openings 15 that are dimensioned and shaped so that when the mass is pressed, extracted water escapes through the openings, as indicated by the arrows. Tests have proven that, especially when hydrophobic grains of peat are used as the additive that is mixed with the waste sludge, water is efficiently extracted, and more so as the mass approaches the mouth 16 of the nozzle, from which the form-pressed mass 17 is squeezed out. The excellent suitability of aggregate-like grains of peat 18 for extracting water is based on the fact that they remain whole during the extrusion process and do not absorb water as particles of other organic materials do. FIG. 3 presents a diagrammatic view of the wall structure of a V-wire hollow cone nozzle that consists of wedge-like openings 15 that widen outward, with wedge-like parts 19 between the openings. A suitable width of the openings 20 of the inner surface may be 1 mm, for example.

In a preferred embodiment of the present invention, after pressing the mass particles that are formed by the pressing are coated in a coating unit 7 with a solution of lime and water or ash and water, for example. The purpose of the coating is to coat the surface of the mass particles 11 to keep the particles coherent on the one hand and to prevent bacterial action in the particles on the other hand. A person skilled in the art understands that other suitable materials and methods may be found by which the goals set for the coating may be reached.

Extrusion may be arranged in a known manner so that the material being extruded exits as a continuous bar and breaks off into suitable lengths due to the effect of its own weight. For example, the mass may be formed into cylindrical particles 11 approximately 15 cm long and 7 cm in diameter. Such particles may shrink during drying to a diameter of approximately 5 cm. It must be noted that the particles shrink considerably as they dry, sqeezing water out and further accelerating the drying process.

Coating the mass particles 11 helps make them hygienic. In the example embodiment, the particles are made even more hygienic by transporting the press-formed and coated particles into a drying oven 9 by means of a transporting conveyor 8a. Drying may take place in the drying oven 9 as a continuous process, with an advantageous oven temperature of 80–100° C., for example. It is also possible to use some other temperature, such as a considerably higher temperature of 200° C., for example, but this may not necessarily provide any benefit and, on the contrary, the particles may dry too quickly and fall apart. The drying oven may be a radiating/hot air oven, for example. The surface of the mass particles is dried in the oven 9 and the coating is hardened so the particles are coherent and withstand handling and piling, for example. At the same time, the surface of the particles is made hygienic, causing bacterial action to cease, and the aerobic bacteria inside the particles are prevented from receiving oxygen.

In the example embodiment of FIG. 1, the coated mass particles that have been surface-dried and hardened in the drying oven 9 are then conveyed into a watertight and airtight space 10 by means of a transporting conveyor 8b. The actual drying of the particles takes place in the space 10, and their final moisture content is approximately 40–50%. The particles are dried by blowing air at a temperature of about 50° C. at the particles for 1–2 days. Drying may take place by blowing warm air into the space 10 through floor grates 12, in which case the air is dried by means of condensation by conducting moisture-saturated air through a cold battery. Condensed water is conducted out of the battery and the dried warm air is recirculated through the floor grates to dry the mass particles.

Drying of small quantities of particles may also be done with a dry air method, in which the relative moisture of the interior of the space 10 is kept at 40%, for example, by means of dehumidifiers. The moisture of the mass particles reaches equilibrium with the ambient air and the particles dry to the desired moisture content. One possible alternate drying method is steam drying, in which the moisture of the mass particles is converted to vapor with the help of steam, and the vapor in the air is dried by means of a wood drying method.

If a relatively large drying space is needed, the watertight and airtight space 10 is advantageously realized as a self-supporting steel arch building constructed in a known method by which such watertight and airtight buildings may be commercially erected at a construction site. If the method is utilized in a smaller scale, the space 10 may be a watertight and airtight container, for example, which is easy to move as needed. An expert in the field understands that the required essentially watertight and airtight space may also be realized in many other ways.

The treatment described above produces dry, hygienic mass particles in which the nutritional and combustible value of the waste sludge has not been lost in reactions sustained by bacterial action. On the contrary, by quickly extracting the moisture contained in the mass and making the formed particles hygienic, bacterial action in the particles is essentially ended. It must be remembered that the bacteria that cause the reaction are mainly moisture-dependent microbes, and bacterial action is essentially prevented when the moisture is removed and the oxygen supply is cut off. On the other hand thermophilic and mesophilic anaerobic bacterial action is essentially ended due to the temperature changes.

Even without further treatment, the dry hygienic mass produced in the above-mentioned manner is already a beneficial product refined from waste sludge, as it has good characteristics as fuel. The mass particles may be used as fuel as is and, for example, in granulated or powdered form in combustion plants with bulk boilers.

The granulated, hygienic dried mass made from waste sludge may be used in such applications as various environmental pellets. Granulated, dry, hygienic mass of suitable acidity and containing binding agents made from animal excrement sludge, for example, may be suitable for fertilizing farmland or making a fertile base for landscaping or as a natural fertilizer. In addition to hydrophobic grains of peat, natural additives for forest fertilization would be wood chips or sawdust and for farmland fertilization, plant fiber, such as straw fiber Hygienic, dry waste sludge-based mass may also be used together with different types of liquid nutrients, whereupon the use of fertilizers may be expanded, thus providing a biological fertilizer alternative that increases microbe activity in the soil, contrary to mineral-based fertilizers.

Hygienic, dry, waste sludge-based mass may be used to make granulated fertilizers by adjusting the factors affecting acidity according to the requirements of the environment or site where the fertilizer will be used and inoculating the granulated hygienic waste sludge mass with a bacteria stock obtained from an enriched culture by spraying it into the mass as a liquid enriching solution. Such a method is a noteworthy alternative, especially on farmland that has been heavily fertilized with chemical fertilizers, where the use of mineral-based fertilizer has reduced the bacterial action of the soil itself and increased the need to fallow because of poor soil.

To produce composted bio-mass, hygienic, dry bio-waste or waste sludge-based, uncoated mass in particle form may be composted as is, for example, in a watertight and airtight space, which in such a case becomes a continuously functioning particle composter. Composting aerobic bacteria are provided ideal conditions in a watertight and airtight space by adjusting the humidity to 60%, for example, and blowing warm, 25–30° C., air through a floor grate for 3–4 days, and spraying the particles with an enriched liquid bacteria solution to activate a composting reaction on the surface of the particles, so the bacterial reaction begins to degrade the mass particles from the outside. Heat created by the reaction rises upward, and in doing so aerates the whole pile from the inside, and not only on the surface, as is the case in outdoor composts, for example. In other words, composting is directed to each separate particle and not to the whole pile. The resulting composted, fine-grained materials may be removed from underneath the pile by means of hydraulic scrapers for post-digestion and the pile may be refilled from the top, making the composting process continuous.

In another example of the realization of the present invention, the process is applied as explained below in the production of biofuel from anaerobic, unstabilized community wastewater sludge or industrial wastewater sludge, such as that produced by the paper industry. Normally, 70–80% of the sludge in wastewater that is pumped to a purification plant may be extracted by means of filtration, flotation or preliminary sedimentation. In conventional wastewater treatment, only about 30% of this primary sludge is extracted. The remainder of the sludge contained in the wastewater is treated in the biological purification process of the plant by means of aeration, post-sedimentation and recirculation of the sludge within the biological process so that only excess sludge not needed in the biological treatment process is removed for compaction, where it is combined with the primary sludge. After compaction, the sludge is transported to a refining process where, typically, a coagulant is added to it, and then the sludge is dried by means of filter pressing, centrifuging or screw pressing. After this, the water content of the sludge is approximately 80%, and because it contains an abundant amount of sludge that has been recirculated through the biological treatment process, it has lost a large portion of its carbon content due to aeration, and it contains an abundant amount of extremely fine-grained material.

In applying the process according to the present invention, the primary sludge separated from the wastewater—advantageously 70–80% of the sludge it contains—is compacted separately (not together with the excess sludge of the biological treatment process). After compaction, a suitable amount of coagulant, preferably a natural polymer, is added to the sludge, and it is dried by means of conventional drying methods. After this, the water content of the primary sludge is approximately 75–80%, and it is still in an essentially anaerobic state.

In the process according to the present invention, an additive containing organic particles in an aerobic state is mixed with the primary sludge. Aggregate-like hydrophobic grains of peat are considered to be the best additive, but other materials such as wood chips, sawdust or shavings may be used, and the additive may also contain straw, bark, or other plant waste. To obtain good results, at least one half of the additive must be particle-like material, most advantageously the hydrophobic grains of peat. The mixture may be further treated by homogenizing it by means of a hydraulic or mechanical mixing screw, for example, before it is transported to an extrusion process. As the goal of extrusion is also to efficiently extract water from the mixture, it is performed by means of the method already described above, in which the organic particle-like additive breaks the cell structure of the sludge and thus efficiently allows the water to be removed from the pressed mass.

After extrusion, the press-formed mass, bar, particles or similar material dries rather quickly in 1–3 days as a result of the bacterial action and the heat it creates, when stored in conditions favorable for aerobic bacterial action. Aerobic bacteria are water-dwelling organisms, and bacterial action is essentially stopped when the water content drops below 50%. Drying generally continues until the water content is 30–40%, due to a shrinking force directed to the particle, and as bacterial action ceases the bar, particles or similar material becomes stabile. The pressed products or products obtained though their further treatment may be further dried by means of known methods.

Hard, aggregate-like hydrophobic grains of peat are a new material the production of which is presented in Finnish Patents No. 94621 and No. 96765 of the applicant. Both their durability and hydrophobicity are in a completely different class than those of conventional solid products made of peat. Production of aggregate-like hydrophobic grains of peat is largely based on the same realizations that are the basis of the present invention presented herein. The production process involves pressing a bar, particles or similar pieces from peat mass by means of the same extrusion method that is applied herein. Also, the drying is carried out in essentially the same way. The dried bar, particles or similar pieces are crushed into grains with a typical diameter of 2–10 mm. The grains are hard and durable as aggregate and hydrophobic. Their characteristics may be further improved by means of a suitable coating, but in the application presented herein, it is advantageous to use the grains uncoated.

The process according to the present invention, in which the additive mixed with the sludge consists of the grains of peat described above, is especially suitable for biofuel production. The grains of peat introduce additional carbon into the pressed mass, and the mass contains more carbon than the peat does. Bacterial action activated by means of the method according to the present invention is so vigorous that drying takes place quickly and little carbon is consumed in drying For the same reason, the quantity of ash formed is minimal, approximately 5% of the quantity of fuel, while the figure for peat fuel is approximately 8%.

As it is apparent from the above, the waste sludge treatment process according to the present invention is applicable in the treatment of different types of waste sludges and their mixtures. The use of lime as a stabilizing coating is also advantageous in biofuels, as lime binds sulphur as it burns and prevent the vaporization of heavy metals.

Certain embodiments of the present invention are presented above, but naturally the present invention is not limited to these, and its embodiments may vary within the scope of the enclosed claims.

I claim:

1. A waste sludge treatment process, comprising:

forming a mixture of a solid additive and sludge, said solid additive including hydrophobic grains of peat;

further treating said mixture by extrusion, said extrusion resulting in a crushing of a cell structure of said waste sludge by said grains of peat thus extracting water contained by the cell structure, said water being extracted from said mixture to produce particles;

coating said particulate products; and hardening said particles and making said particles hygienic by essentially preventing bacterial action within them.

2. The process according to claim 1, wherein said coating includes a mixture of lime and water or ash and water.

3. The process according to claim 1, wherein at least one half of the solid additive consists of aggregate hydrophobic grains of peat.

4. The process according to claim 1, wherein the solid additive further includes at least one member selected from the group consisting of peat, wood chips, sawdust, bark, straw, and dried plant parts.

5. The process according to claim 3, wherein the solid additive further includes at least one member selected from the group consisting of peat, wood chips, sawdust, bark, straw, and dried plant parts.

6. The process according to claim 1, wherein the extrusion is performed with a V-wire hollow cone nozzle that includes outward opening wedge-shaped cracks in a wall.

7. The process according to claim 1, wherein hardening of the particles and making them hygienic includes heating a surface of the particles.

8. The process according to claim 1, wherein hardening the particles and making the particles hygienic includes the steps of:

hardening and making hygienic a surface layer of said particles; and completely hardening and making hygienic said particles by drying, so that a moisture content of the particles is 40% to 50% by weight.

* * * * *

UNITED STATES PATENT AND TRADEMARK OFFICE
CERTIFICATE OF CORRECTION

PATENT NO. : 5,972,058
DATED : October 26, 1999
INVENTOR(S): Esko Ilmari Torkkeli It is certified that error appears in the above-identified patent and that said Letters Patent is hereby corrected as shown below:

Title page,
Under the item [30] "Foreign Application Priority Data", please change the country abbreviation from "[FR]" to --[FI]-- and the country listed from "France" to --Finland--.

Signed and Sealed this

Twenty-seventh Day of February, 2001

*Attest:*

NICHOLAS P. GODICI

*Attesting Officer*    Acting Director of the United States Patent and Trademark Office